(12) United States Patent
Tang et al.

(10) Patent No.: US 11,245,854 B2
(45) Date of Patent: Feb. 8, 2022

(54) INTELLIGENT PHOTOGRAPHY SYSTEM

(71) Applicant: Wuhan Lianyi Heli Technology Co., Ltd, Wuhan (CN)

(72) Inventors: Wenming Tang, Wuhan (CN); Bin Chen, Wuhan (CN); Yong Li, Wuhan (CN); Yu Lu, Wuhan (CN); Yuni Chen, Wuhan (CN); Zhiwei Gong, Wuhan (CN); Xinyu Ye, Wuhan (CN); Jian Shi, Wuhan (CN); Siqi Guo, Wuhan (CN)

(73) Assignee: Wuhan Lianyi Heli Technology Co., Ltd, Wuhan (CN)

( * ) Notice: Subject to any disclaimer, the term of this patent is extended or adjusted under 35 U.S.C. 154(b) by 0 days.

(21) Appl. No.: 17/093,916

(22) Filed: Nov. 10, 2020

(65) Prior Publication Data
US 2021/0144309 A1      May 13, 2021

(30) Foreign Application Priority Data
Nov. 12, 2019   (CN) .......................... 201921953245.0

(51) Int. Cl.
*H04N 5/232* (2006.01)
*H04N 5/225* (2006.01)

(52) U.S. Cl.
CPC ....... *H04N 5/23299* (2018.08); *H04N 5/2252* (2013.01); *H04N 5/225251* (2018.08); *H04N 5/23296* (2013.01)

(58) Field of Classification Search
None
See application file for complete search history.

(56) References Cited

U.S. PATENT DOCUMENTS 4,980,871 A * 12/1990 Sieber ..................... G01S 3/807
                                                         318/648
5,396,287 A *  3/1995 Cho ................... H04N 5/23299
                                                         348/211.8

(Continued)

FOREIGN PATENT DOCUMENTS

| CN | 110266943 A | 9/2019 |
| JP | 2008529446 A | 7/2008 |

(Continued)

OTHER PUBLICATIONS

Office Action issued in counterpart Japanese Patent Application No. 2020-186190, dated Dec. 2, 2021.

*Primary Examiner* — William B Perkey
(74) *Attorney, Agent, or Firm* — Westbridge IP LLC

(57) ABSTRACT

Disclosed is an intelligent photography system including an intelligent tripod head, a search camera, a shooting camera, a communication component and a control component. The search camera is mounted on the intelligent tripod head, and configured to search for a target to be shot. The shooting camera is mounted on the intelligent tripod head, and configured to take a target image. The communication component is fixed on the intelligent tripod head. The control component includes a circuit board component electrically connected with the intelligent tripod head, the search camera, the shooting camera and the communication component respectively, so that remote control of the shooting camera for shooting is realized, photographers are freed, and better effects are achieved.

9 Claims, 4 Drawing Sheets

(56) References Cited

U.S. PATENT DOCUMENTS

| | | | | |
|---|---|---|---|---|
| 5,523,783 | A * | 6/1996 | Cho | H04N 5/23206 |
| | | | | 348/157 |
| 5,572,317 | A * | 11/1996 | Parker | B25J 9/1697 |
| | | | | 356/139.06 |
| 7,140,789 | B1 * | 11/2006 | Reinert | H04N 5/23206 |
| | | | | 396/428 |
| 7,450,835 | B2 * | 11/2008 | Lackey | F16M 11/126 |
| | | | | 348/169 |
| 9,800,769 | B2 * | 10/2017 | Taylor | G01S 3/7864 |
| 2009/0317071 | A1 * | 12/2009 | David | G03B 17/561 |
| | | | | 396/428 |
| 2017/0195536 | A1 * | 7/2017 | Sakai | H04N 5/23203 |
| 2018/0035056 | A1 * | 2/2018 | Jindal | H04N 5/23206 |
| 2020/0041250 | A1 * | 2/2020 | Ikebuchi | G01B 11/002 |

FOREIGN PATENT DOCUMENTS

| | | | |
|---|---|---|---|
| JP | 2009284452 | A | 12/2009 |
| JP | 2009296350 | A | 12/2009 |

\* cited by examiner

INTELLIGENT PHOTOGRAPHY SYSTEM

CROSS-REFERENCE TO RELATED APPLICATIONS

This application claims priority to Chinese Patent Application No. 201921953245.0, filed on Nov. 12, 2019, entitled "Intelligent Photography System", the entire content of which is hereby incorporated by reference.

TECHNICAL FIELD

The present application relates to the technical field of intelligent photography, in particular to an intelligent photography system.

BACKGROUND

With the development of camera technology, there are more and more eco-photography enthusiasts and sports photography enthusiasts who take natural creatures as their subjects. This type of photography requires that the photographer must observe the state of the subject in real time. In most common photography methods, cameras are handheld for operation and mechanical tripod heads are manually operated. The photographer must be under extreme shooting conditions and difficult shooting methods for a long time.

In this way, the best shooting time will often be missed, which cannot meet the requirements of real-time shooting, image transmission quality and distance control in ecological and sports photography.

SUMMARY

Based on the above, the present application provides provide an intelligent photography system, aiming to solve the problem that remote photography cannot be performed.

In order to realize the above purpose, the intelligent photography system provided by the present application includes:

an intelligent tripod head;

a search camera installed on the intelligent tripod head and configured to search a target to be shot;

a shooting camera installed on the intelligent tripod head and configured to shoot a target image;

a communication component fixed on the intelligent tripod head; and a control component including a circuit board component electrically connected with the intelligent tripod head, the search camera, the shooting camera and the communication component respectively.

In one embodiment, the search camera is rotatably mounted on the shooting camera in an vertical direction.

In one embodiment, the intelligent tripod head includes:

a tripod head body;

a mounting bracket, wherein an upper end of the mounting bracket is rotatably mounted on the tripod head body along a horizontal axis, and a lower end of the mounting bracket is configured for mounting the shooting camera; and a pitching drive component arranged on the tripod head body, electrically connected to the circuit board component and configured for driving a rotation of the mounting bracket.

In one embodiment, the mounting bracket is movably mounted on the tripod head body in the vertical direction.

In one embodiment, the intelligent photography system further includes a base disposed below the intelligent tripod head;

the intelligent tripod head is rotatably mounted on the base along a vertical axis.

In one embodiment, the intelligent photography system further includes a zoom component disposed on the intelligent tripod head, the zoom component including:

a zoom adjusting component including a focusing gear ring sleeved and fixed on a focusing ring of the shooting camera; and a zoom drive component electrically connected to the circuit board component and including a drive gear rotatably mounted on the intelligent tripod head and externally meshed with the focusing gear ring.

In one embodiment, the intelligent photography system further includes:

a viewfinder camera arranged on the shooting camera, communicating with the communication component, and electrically connected with the circuit board component to obtain a viewfinder screen image of the shooting camera; and/or a monitoring camera communicating with the communication component and electrically connected with the circuit board component, and configured to shot an environmental monitoring image.

In one embodiment, the monitoring camera is disposed on the intelligent tripod head.

In one embodiment, the intelligent tripod head includes a tripod head body and a mounting bracket mounted on the tripod head body, the mounting bracket is configured for mounting the shooting camera;

a mounting cavity is defined in the tripod head body, the tripod head body has a first mounting surface facing a same orientation as a shooting lens of the shooting camera and a second mounting surface opposite to the first mounting surface, the first mounting surface is defined with a first observation hole communicating with the mounting cavity, and the second mounting surface is defined with a second observation hole communicating with the mounting cavity; and the monitoring camera is received in the installation cavity, and a shooting lens of the monitoring camera is arranged corresponding to the first observation hole or the second observation hole.

In one embodiment, the intelligent photography system includes two monitoring cameras, a shooting lens of one of the monitoring cameras is provided corresponding to the first observation hole and a shooting lens of another of the monitoring cameras is provided corresponding to the second observation hole.

In the technical solutions provided by the present application, the search camera is configured to search for a target to be shot, and transmit the shot target to be shot to the control component through the communication component. The control component controls the movement of the intelligent tripod head, so as to enable the shooting camera to obtain better shot screen images, and simultaneously control the shooting camera to adjust a shooting parameter, so as to enable the shooting camera to obtain better shot images, which realizes remote control of shooting by the shooting camera, liberates photographers, and has better effects.

BRIEF DESCRIPTION OF THE DRAWINGS

In order to more clearly explain the embodiments of this application or the technical solutions in the prior art, the following will briefly introduce the drawings required in the embodiments or the description of the prior art. Obviously, the drawings in the following description are only some embodiments of this application. For those of ordinary skill in the art, without paying any creative work, other drawings can be obtained according to the structures shown in these drawings.

Figure 1:
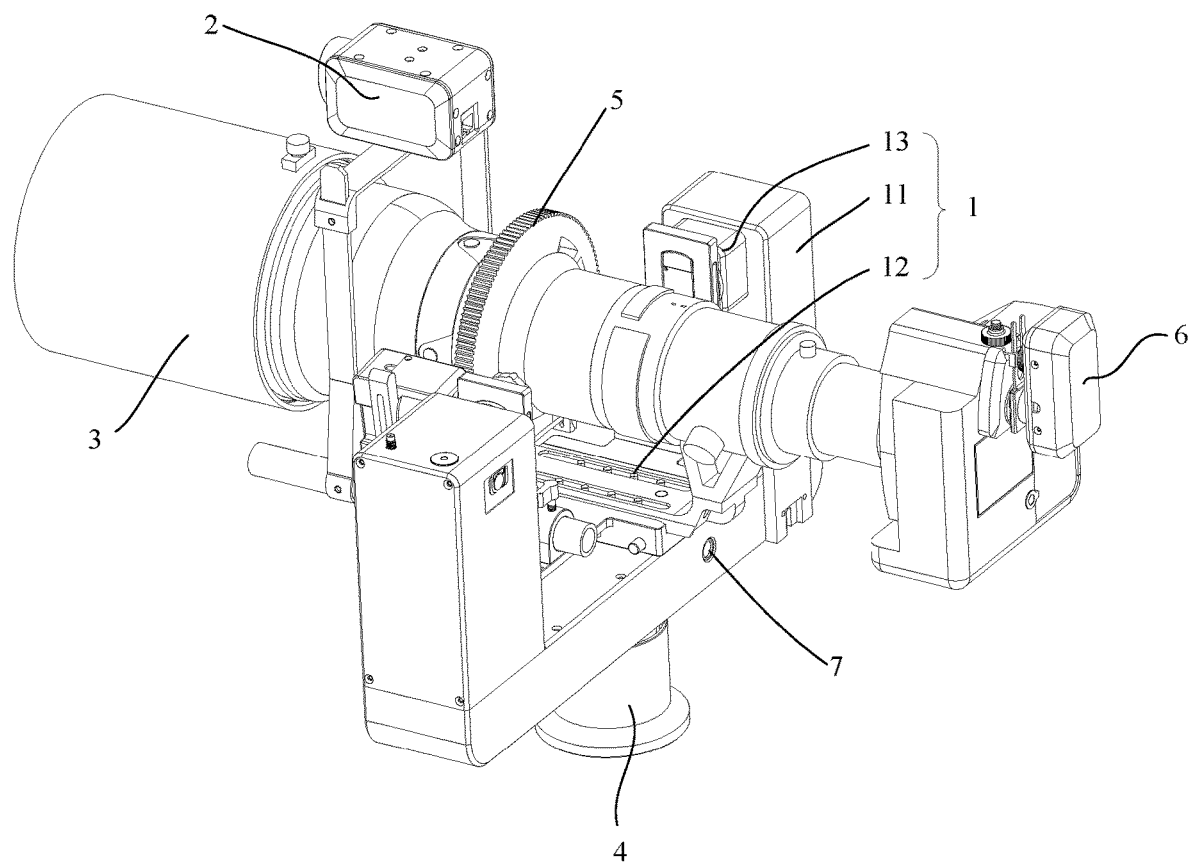
FIG. 1 is a perspective view of an intelligent photography system according to an embodiment of the present application, viewed from one angle.

The realization of the purpose, functional characteristics and advantages of the present application will be further explained in combination with embodiments and with reference to the accompanying drawings.

DETAILED DESCRIPTION OF THE EMBODIMENTS

The following will clearly and completely describe the technical solutions of the embodiments of the present application with reference to the accompanying drawings in the embodiments of the present application. Obviously, the illustrated embodiments are only parts and not all of the embodiments of the present application. Based on the embodiments of the present application, all other embodiments obtained by those ordinary skilled in the art without creative effort fall in the scope claimed by the present application.

It should be noted that, if there is a directional indication (such as upper, lower, left, right, front, rear, etc.) in the embodiments of the present application, the directional indication is only used to describe a relative positional relationship, a movement situation, etc. between various components under a specific posture (as shown in the drawings), and if the specific posture changes, the directional indication changes accordingly.

In addition, if there are descriptions referring to "first", "second" and the like in embodiments of the present invention, the descriptions of "first", "second" and the like are only for descriptive purposes and cannot be understood as indicating or implying their relative importance or implicitly indicating the number of indicated technical features. Thus, features defined by "first" and "second" may explicitly or implicitly include at least one of the features. In addition, the meaning of "and/or" appearing in the full text includes three parallel solutions. Taking "A and/or B" as an example, it includes only solution A, or only solution B, or both solutions A and B. In addition, the technical solutions between the various embodiments can be combined with each other, but the combinations must be made based on the ability of those skilled in the art to realize. When a combination of technical solutions is contradictory or cannot be realized, it should be considered that the combination of such technical solutions does not exist and is not within the scope claimed by the present application.

With the development of camera technology, there are more and more eco-photography enthusiasts and sports photography enthusiasts who take natural creatures as their subjects. This type of photography requires that the photographer must observe the state of the subject in real time. In most common photography methods, cameras are handheld for operation and mechanical tripod heads are manually operated. The photographer must be under extreme shooting conditions and difficult shooting methods for a long time. In this way, the best shooting time will often be missed, which cannot meet the requirements of real-time shooting, image transmission quality and distance control in ecological and sports photography.

Figure 2:
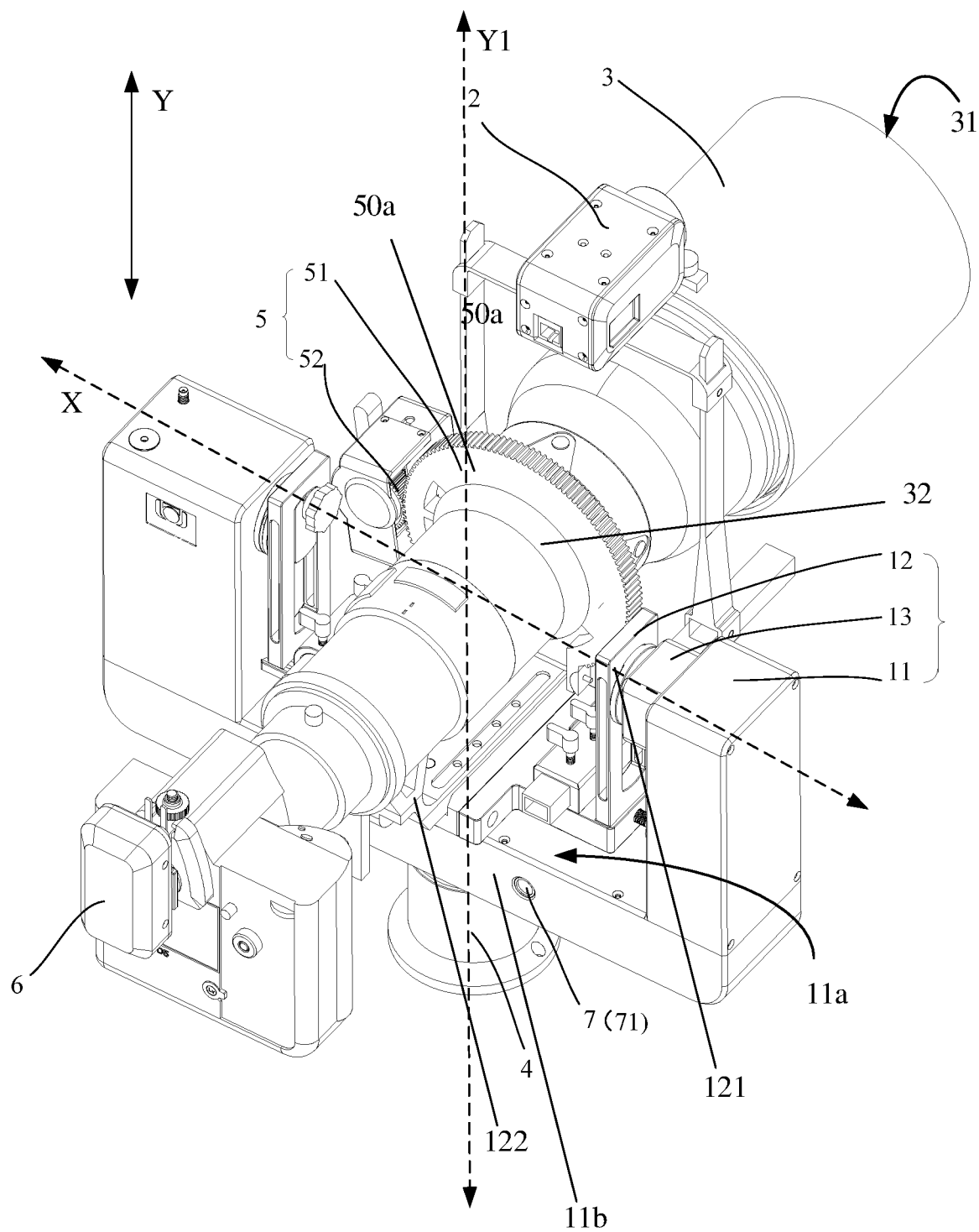
FIG. 2 is a perspective view of the intelligent photography system of FIG. 1, viewed from another angle.
Figure 3:
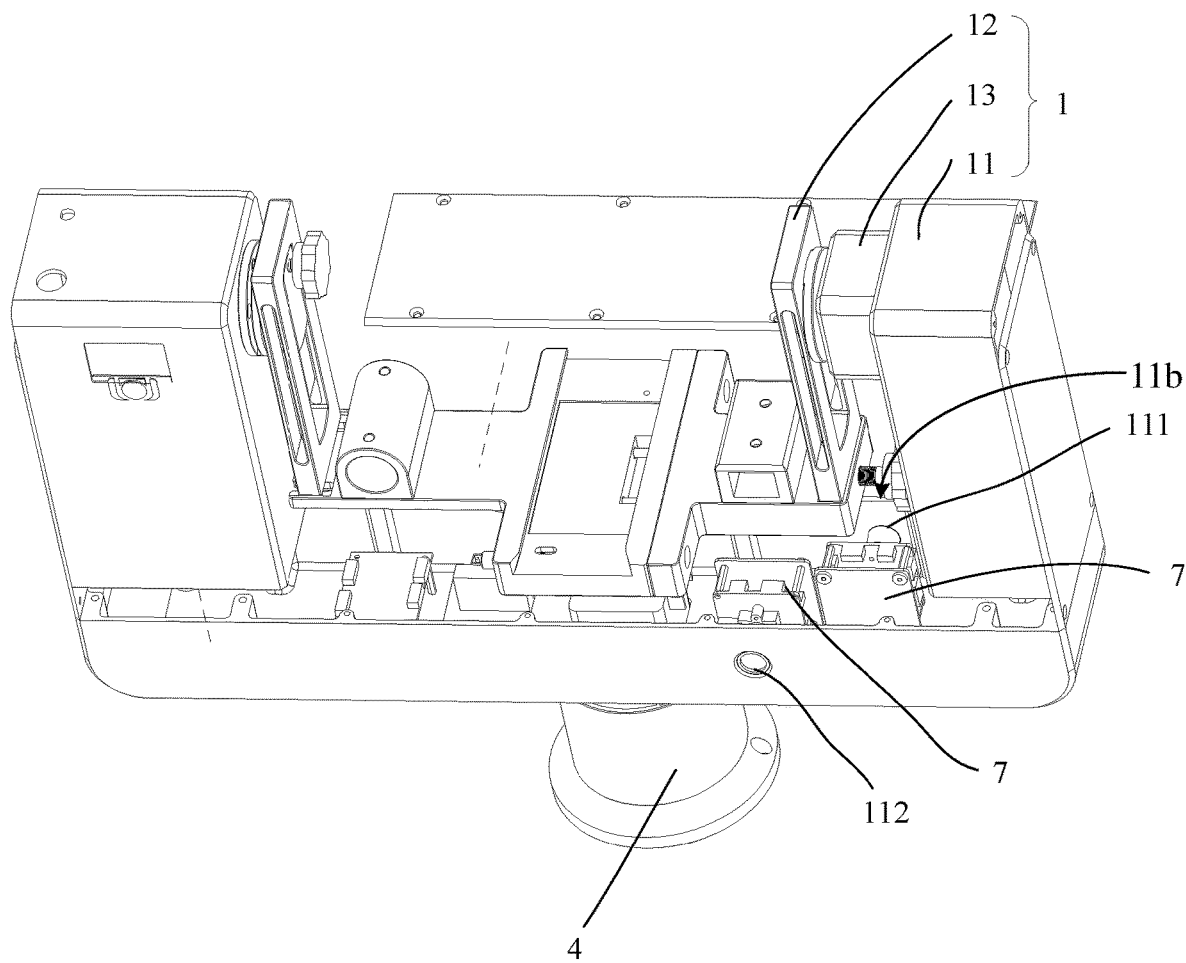
FIG. 3 is a perspective view of an intelligent tripod head in FIG. 1 according to an embodiment of the present application.
Figure 4:
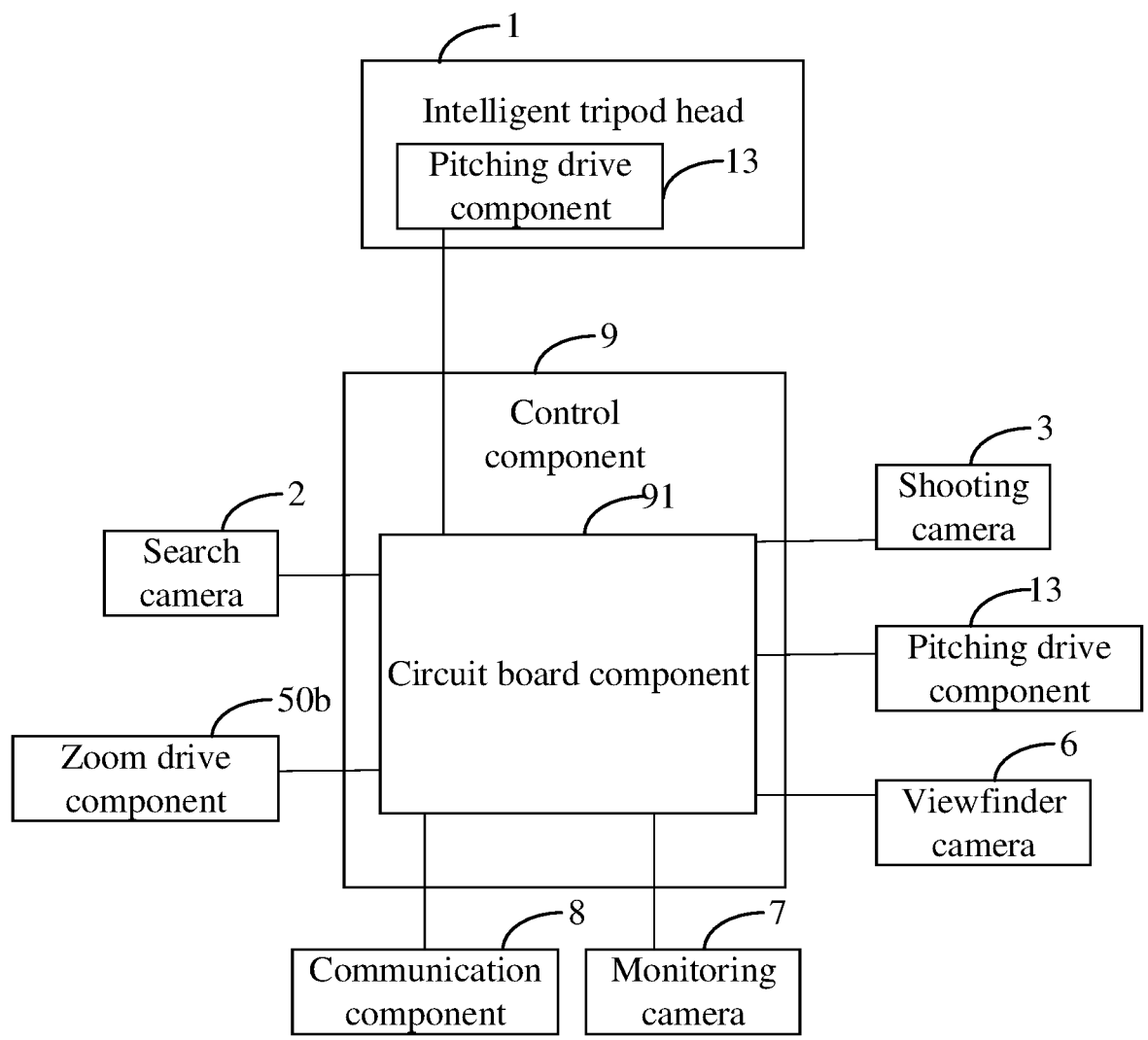
FIG. 4 is a schematic diagram showing electrical connections between part components of the intelligent photography system of FIG. 1.

The present application provides an intelligent photography system. FIGS. 1 to 3 are schematic perspective views of embodiments of the intelligent photography system. FIG. 4 is a schematic diagram showing electrical connections between part components of the intelligent photography system.

Referring to FIGS. 1 to 4, the intelligent photography system 100 includes an intelligent tripod head 1, a search camera 2, a shooting camera 3, a communication component 8 and a control component 9. The search camera 2 is mounted on the intelligent tripod head 1 for searching for a target to be shot. The shooting camera 3 is installed on the intelligent tripod head 1 for shooting a target image. The communication component 8 is fixed on the intelligent tripod head 1, and the control component 9 includes a circuit board component 91, which is electrically connected with the intelligent tripod head 1, the search camera 2, the shooting camera 3 and the communication component 8 respectively.

In the technical solution provided by the present application, the search camera 2 is configured to search for a target to be shot, and transmit a shot target to be shot to the control component 9 through the communication component 8. The control component 9 controls the movement of the intelligent tripod head 1, so as to enable the shooting camera 3 to obtain better shot screen images, and simultaneously control the shooting camera 3 to adjust a shooting parameter, so as to enable the shooting camera 3 to obtain better shot images, which realizes remote control of shooting by the shooting camera 3, liberates photographers, and has better effects.

In the technical solutions of the present application, a mounting manner of the search camera 2 is not limited. For example, the search camera 2 may be directly fixed on the shooting camera 3, or be movably mounted on the shooting camera 3. In one embodiment, the search camera 2 is rotatably mounted on the shooting camera 3 in a vertical direction Y. such arrangement is to make a positioning target screen of the search camera 2 and a shooting screen of the shooting camera 3 coincide as much as possible, and it is convenient to capture a screen which is displayed during the target search in time, and obtain the best shooting time and a better shooting effect. It should be noted that a mounting manner of the search camera 2 being rotatably mounted on the shooting camera 3 in the vertical direction Y is not limited, for example, a hinged structure, an inverted structure or the like can be provided to rotatably mount the search camera 2 on the shooting camera 3.

It should be noted that the search camera 2 can also shoot dynamic video images. When the shooting camera 3 shoots a static image, the search camera 2 can simultaneously shoot dynamic video images. The shooting camera 3 and the search camera 2 can simultaneously capture a photo and record a video, thereby having a better effect.

A pitching rotation and/or a horizontal rotation of the shooting camera 3 may be required according to actual shooting requirements. In one embodiment, the intelligent tripod head 1 includes a tripod head body 11, a mounting bracket 12 and a pitching drive component 13. An upper end 121 of the mounting bracket 12 is rotatably mounted on the tripod head body 11 along a horizontal axis X, and a lower end 122 is configured to hold the shooting camera 3. The pitching drive component 13 is arranged in the tripod head body 11 to drive the rotation of the mounting bracket 12. The pitching drive component 13 is electrically connected to the circuit board component 91. With such arrangement, the pitching adjustment of the shooting camera 3 is realized, so that the shooting camera 3 is easily adjusted to a required posture to obtain a better shooting effect. It should be noted that the pitching drive component 13 mainly uses a motor as a power source to drive the swing of the mounting bracket 12, thereby realizing a pitching posture of the shooting camera 3.

The intelligent photography system 100 further includes a base 4 arranged below the intelligent tripod head 1. The intelligent tripod head 1 is rotatably mounted on the base 4 along a vertical axis Y1. With such arrangement, a horizontal rotation adjustment of the shooting camera 3 is realized. It is convenient for the shooting camera 3 to be adjusted to a desired posture to obtain a better shooting effect. It should be noted that a driving manner for the horizontal rotation of the intelligent tripod head 1 adopts a rotary driving component, and also mainly uses a motor as a power source to drive the rotation of the intelligent tripod head 1, thereby realizing postures of the shooting camera 3 in the horizontal rotation.

In order that the shooting camera 3 is better fixed on the mounting bracket 12, in one embodiment, the mounting bracket 12 is provided with an adjustment component to enable the mounting bracket 12 to be movably mounted on the tripod head body 11 in the vertical direction Y. For example, a mounting groove and a mounting block are provided between the mounting bracket 12 and the tripod head body 11. A vertical movement of the mounting bracket 12 is realized by adjusting a position of the mounting block in the mounting groove. With such arrangement, on one hand, it is convenient to adapt to the installation of lenses of different sizes, and try to ensure that the center of gravity in the vertical direction of the shooting lens 31 and a axis of a pitching rotation shaft overlap. On the other hand, a height of the mounting bracket 12 can be reduced with enough pitch driving force, so that the shooting camera 3 can obtain a lower position, which is convenient for shooting and has better effects.

Considering that zooms of the shooting camera 3 may be needed to be carried out during the shooting, in one embodiment, as shown in FIG. 2, the intelligent photography system 100 further includes a zoom component 5 provided on the intelligent tripod head 1. The zoom component 5 includes a zoom adjustment component 50a and a zoom drive component 50b. The zoom adjustment component 50a includes a focusing gear ring 51. The focusing gear ring 51 is sleeved and fixed on a focusing ring 32 of the shooting camera 3. The zoom drive component 50b includes a drive gear 52 rotatably mounted on the intelligent tripod head 1. The drive gear 52 is externally meshed with the focusing gear ring 51, and the zoom drive component 50b is electrically connected to the circuit board component 91, so as to facilitate remote control of zoom, realize remote control of adjustment of shooting parameters of the shooting camera 3 in the shooting process, and have better effects.

In the technical solutions of the present application, the authority of the shooting camera 3 can be directly obtained to acquire the viewfinder screen image. Of course, if the authority of the shooting camera 3 is limited, a viewfinder camera 6 can be provided to to obtain a live view. In one embodiment, the intelligent photography system 100 further includes a viewfinder camera 6 provided on the shooting camera 3. The viewfinder camera 6 is communicating with the communication component 8, and electrically connected with the circuit board component 91 to obtain a viewfinder screen image of the shooting camera 3. Such arrangement facilitates the transmission of the viewfinder screen image of the shooting camera 3 to a control terminal to realize the control of the shooting camera 3.

In addition, the intelligent photography system 100 further includes a monitoring camera 7. The monitoring camera 7 is communicating with the communication component 8, and electrically connected with the circuit board component 91. The monitoring camera 7 is configured to acquire an environmental monitoring image. The monitoring camera 7 carries out security surveillance around the intelligent photography system 100, to ensure that the intelligent photography system 100 is in a safe environment, and the surrounding environment of the intelligent photography system 100 will not affect the shooting through real-time monitoring at the control terminal. In case of special situations, the photographer can quickly know the surrounding situations and deal with the situations.

It should be noted that the above-mentioned solutions of setting the viewfinder camera 6 and the monitoring camera 7 can be selected either or both. Of course, setting both the viewfinder camera 6 and the monitoring camera 7 enables the intelligent photography system 100 to obtain better shooting images.

The monitoring camera 7 is configured to monitor a shooting environment of the intelligent photography system 100. The monitoring camera 7 may be individually provided with a support device independent of the intelligent tripod head 1. Of course, the monitoring camera 7 can also be arranged on the intelligent tripod head 1. Specifically, referring to FIG. 3, in an embodiment, the monitoring camera 7 is arranged on the intelligent tripod head 1, so that the monitoring camera 7 is integrated on the intelligent tripod head 1, and the number of accessories is reduced to facilitate the carrying of intelligent photography system 100 during outdoor shooting.

The specific mounting manner of the monitoring camera 7 on the intelligent tripod head 1 is also described in the present application. Specifically, the intelligent tripod head 1 includes a tripod head body 11 and a mounting bracket 12 mounted on the tripod head body 11. The mounting bracket 12 is configured to mount the shooting camera 3. A mounting cavity 11a is defined in the tripod head body 11. The tripod head body 11 has a first mounting surface 11b facing a same direction as the shooting lens 31 of the shooting camera 3 and a second mounting surface 11c opposite to the first mounting surface 11b. The first mounting surface 11b is defined with a first observation hole 111 communicating with the mounting cavity 11a, and the second mounting surface 11c is defined with a second observation hole 112 communicating with the mounting cavity 11a. The monitoring camera 7 is received in the mounting cavity 11a, and a shooting lens 71 of the monitoring camera 7 faces the first observation hole 111 or the second observation hole 112, thereby facilitating the integration of the monitoring camera 7 and having better effects.

Further, for better security, in one embodiment, there are two monitoring cameras 7. A shooting lens 71 of one of the monitoring cameras 7 is arranged corresponding to the first observation hole 111, and a shooting lens 71 of another of the monitoring cameras 7 is arranged corresponding to the second observation hole 112. With more monitoring cameras 7, the shooting environment of the intelligent photography system is monitored from multiple angles, and the surrounding situations are obtained more comprehensively and quickly.

The above are only some embodiments of the present application and not intended to limit a scope of the application. Any equivalent structural transformation made under the concept of the present application based on the specification and the accompanying drawings of the present application, or any directly/indirectly application to other related technical fields, is included in the patent protection scope claimed by the present application.

What is claimed is:

1. An intelligent photography system, comprising:
an intelligent tripod head;
a search camera installed on the intelligent tripod head and configured to search a target to be shot;
a shooting camera installed on the intelligent tripod head and configured to shoot a target image;
a communication component fixed on the intelligent tripod head; and
a control component comprising a circuit board component electrically connected with the intelligent tripod head, the search camera, the shooting camera and the communication component respectively,
wherein the intelligent tripod head comprises:
a tripod head body;
a mounting bracket, wherein an upper end of the mounting bracket is rotatably mounted on the tripod head body along a horizontal axis, and a lower end of the mounting bracket is configured for mounting the shooting camera; and
a pitching drive component arranged on the tripod head body, electrically connected to the circuit board component and configured for driving a rotation of the mounting bracket.

2. The intelligent photography system of claim 1, wherein the search camera is rotatably mounted on the shooting camera in a vertical direction.

3. The intelligent photography system of claim 1, wherein the mounting bracket is movably mounted on the tripod head body in a vertical direction.

4. The intelligent photography system of claim 1, further comprising a base arranged below the intelligent tripod head;
wherein the intelligent tripod head is rotatably mounted on the base along a vertical axis.

5. An intelligent photography system, comprising:
an intelligent tripod head;
a search camera installed on the intelligent tripod head and configured to search a target to be shot;
a shooting camera installed on the intelligent tripod head and configured to shoot a target image;
a communication component fixed on the intelligent tripod head;
a control component comprising a circuit board component electrically connected with the intelligent tripod head, the search camera, the shooting camera and the communication component respectively; and
a zoom component disposed on the intelligent tripod head, comprising:
a zoom adjusting component comprising a focusing gear ring sleeved and fixed on a focusing ring of the shooting camera; and
a zoom drive component electrically connected to the circuit board component and comprising a drive gear rotatably mounted on the intelligent tripod head and externally meshed with the focusing gear ring.

6. An intelligent photography system, comprising:
an intelligent tripod head;
a search camera installed on the intelligent tripod head and configured to search a target to be shot;
a shooting camera installed on the intelligent tripod head and configured to shoot a target image;
a communication component fixed on the intelligent tripod head;
a control component comprising a circuit board component electrically connected with the intelligent tripod head, the search camera, the shooting camera and the communication component respectively; and
a viewfinder camera arranged on the shooting camera, communicating with the communication component, and electrically connected with the circuit board component to obtain a viewfinder screen image of the shooting camera; and/or
a monitoring camera communicating with the communication component and electrically connected with the circuit board component, and configured to shot an environmental monitoring image.

7. The intelligent photography system of claim 6, wherein the monitoring camera is disposed on the intelligent tripod head.

8. The intelligent photography system of claim 7, wherein:
the intelligent tripod head comprises a tripod head body and a mounting bracket mounted on the tripod head body, the mounting bracket is configured for mounting the shooting camera;
a mounting cavity is defined in the tripod head body, the tripod head body has a first mounting surface facing a same orientation as a shooting lens of the shooting camera and a second mounting surface opposite to the first mounting surface, the first mounting surface is defined with a first observation hole communicating with the mounting cavity, and the second mounting surface is defined with a second observation hole communicating with the mounting cavity; and
the monitoring camera is received in the installation cavity, and a shooting lens of the monitoring camera is arranged corresponding to the first observation hole or the second observation hole.

9. The intelligent photography system of claim 8, wherein the intelligent photography system comprises two monitoring cameras, a shooting lens of one of the monitoring cameras is provided corresponding to the first observation hole and a shooting lens of another of the monitoring cameras is provided corresponding to the second observation hole.

* * * * *